United States Patent
Xie et al.

(10) Patent No.: US 8,685,904 B2
(45) Date of Patent: Apr. 1, 2014

(54) AQUEOUS LUBRICANT EMULSION FOR MEDICAL OR APPARATUS AND A METHOD OF WASHING

(75) Inventors: Ying Wei Xie, Shanghai (CN); Xiaolei Jia, Shanghai (CN)

(73) Assignee: 3M Innovative Properties Company, St. Paul, MN (US)

(*) Notice: Subject to any disclaimer, the term of this patent is extended or adjusted under 35 U.S.C. 154(b) by 434 days.

(21) Appl. No.: 13/000,224

(22) PCT Filed: Jun. 19, 2009

(86) PCT No.: PCT/US2009/047921
§ 371 (c)(1),
(2), (4) Date: Apr. 25, 2011

(87) PCT Pub. No.: WO2009/155495
PCT Pub. Date: Dec. 23, 2009

(65) Prior Publication Data
US 2011/0190179 A1 Aug. 4, 2011

(30) Foreign Application Priority Data

Jun. 20, 2008 (CN) .......................... 2008 1 0128864
Jun. 19, 2009 (CN) .......................... 2009 1 0148255

(51) Int. Cl.
*C10M 173/00* (2006.01)
*C23G 5/06* (2006.01)

(52) U.S. Cl.
USPC ........... 508/308; 508/390; 508/459; 508/579; 508/583; 510/161; 510/417; 134/40; 134/42

(58) Field of Classification Search
USPC ...................................... 508/308; 134/40, 42
See application file for complete search history.

(56) References Cited

U.S. PATENT DOCUMENTS

| | | | |
|---|---|---|---|
| 2,690,426 A | 9/1954 | Jefferson | |
| 4,325,804 A * | 4/1982 | Everett et al. | 208/58 |
| 4,330,422 A * | 5/1982 | Tesch | 134/34 |
| 5,102,567 A * | 4/1992 | Wolf | 508/563 |
| 5,340,486 A | 8/1994 | Willoughby | |
| 5,614,479 A * | 3/1997 | Chardon | 508/283 |
| 5,688,747 A | 11/1997 | Khan | |
| 6,046,143 A | 4/2000 | Khan | |
| 6,054,421 A * | 4/2000 | Lyons et al. | 508/491 |
| 6,087,308 A * | 7/2000 | Butler et al. | 508/486 |
| 6,090,761 A * | 7/2000 | Butler et al. | 508/486 |
| 6,187,176 B1 * | 2/2001 | Hantzer et al. | 208/268 |
| 6,281,175 B1 * | 8/2001 | Lyons et al. | 508/491 |
| 6,391,832 B2 * | 5/2002 | Lyons et al. | 508/491 |
| 6,576,298 B2 * | 6/2003 | Bennett et al. | 427/424 |
| 6,743,758 B2 | 6/2004 | Li | |
| 7,273,833 B2 | 9/2007 | Uda | |
| 8,309,500 B2 * | 11/2012 | Beatty et al. | 508/579 |
| 2003/0228339 A1 | 12/2003 | El-Nokaly | |
| 2004/0007687 A1 | 1/2004 | Dobbelstein | |
| 2005/0245404 A1 * | 11/2005 | Repo | 508/428 |
| 2005/0277718 A1 | 12/2005 | Johnson | |
| 2006/0199896 A1 | 9/2006 | Walton | |
| 2008/0118626 A1 | 5/2008 | McWilliams | |
| 2008/0124368 A1 | 5/2008 | Sarangapani | |
| 2009/0036546 A1 * | 2/2009 | Shah et al. | 514/762 |

FOREIGN PATENT DOCUMENTS

| | | |
|---|---|---|
| CN | 1138620 | 12/1996 |
| EP | 1 380 684 | 1/2004 |
| JP | 57-75642 | 5/1982 |
| WO | WO 99-15152 | 4/1999 |
| WO | WO 99-47187 | 9/1999 |
| WO | WO 00-37592 | 6/2000 |
| WO | WO 01-72348 | 10/2001 |

OTHER PUBLICATIONS

ASTM B117-11; Standard Practice for Operating Salt Spray (Fog) Apparatus; 2011; pp. 1-12.
GB/T 3142-1982, Lubricants—Determination of load-carrying capacity (four balls method); Jul. 20, 1982, and translation.
GB 15979-2002, Test of Colony Forming Units (CFU); Hygienic standard for disposable sanitary products, and translation.
European Search Report for PCT/US2009/047921, dated Dec. 5, 2011, 4 pages.
International Search Report for PCT/US2009/047921, mailed Aug. 14, 2009, 3 pages.
Written Opinion for PCT/US2009/047921, mailed Aug. 14, 2009, 5 pages.

* cited by examiner

*Primary Examiner* — Ellen McAvoy
(74) *Attorney, Agent, or Firm* — Thomas M. Spielbauer

(57) ABSTRACT

An aqueous lubricant emulsion for medical or food apparatus, comprising: (a) 5 wt % to 30 wt % of a mineral oil; (b) 5 wt % to 30 wt % of an emulsifier system consisting of two emulsifiers selected from the group consisting of sorbitan fatty acid ester, polyoxyethylene sorbitan fatty acid ester, oleyl alcohol ether, triethanolamine oleate, wherein the mass ratio of the two emulsifiers is in a range of 2:8 to 8:2; (c) 0.5 wt % to 5 wt % of one or more coemulsifiers selected from the group consisting of fatty alcohols, long-chain fatty acids, and diisooctyl succinate sulfonates; and (d) the balance of water. A method for washing medical or food apparatus including the step of subjecting the medical or food apparatus to a treatment using the lubricant emulsion according to the invention after a washing step for the medical or food apparatus is also described.

14 Claims, No Drawings

AQUEOUS LUBRICANT EMULSION FOR MEDICAL OR APPARATUS AND A METHOD OF WASHING

CROSS REFERENCE TO RELATED APPLICATIONS

This application claims priority to Chinese Patent Application No. 200810128864.6, filed on Jun. 20, 2008 and Chinese Patent Application No. 200910148255.1, filed Jun. 19, 2009.

BACKGROUND

In hospitals all around the world, medical apparatus, such as surgical instruments, are utilized frequently every day. Rustiness and joint malfunction of the medical apparatus is a problem that has existed for a long time. These problems can increase both operating cost and may increase medical risk in procedures in hospitals. Hospitals derust the apparatus by utilizing derusting agents, which requires significant labor in the supply rooms. Because the derusting agents generally contain strong acid systems, the frequent utilization of derusting agents will damage the surface of apparatus (e.g., by causing plating on the apparatus and/or damage existing desired plating on the apparatus) which shortens the service life of the apparatus.

In order to increase the quality of the medical apparatus after washing, improve infection risk in hospitals, decrease the maintenance cost of the apparatus, prolong the service life of the apparatus, and potentially decrease operating risk, some hospitals are treating the medical apparatus after washing with lubricants. A lubricant forms a protective film on the surface of the apparatus, which prevents oxygen gas in air from contacting a stainless steel apparatus, but capable of being penetrated by high pressure water vapor.

Water-soluble lubricants are applied to surfaces in the metal processing industry. U.S. Pat. No. 7,273,833 relates to a water soluble lubricant used for metal cutting processing which utilizes an amine group-containing polymer with a molecular weight of 1,000-1,000,000 as a lubricating ingredient; CN 1,138,620A discloses a water-based coating liquid which has functions of lubrication, cooling, washing and anticorrosion and uses turkey red oil, polyethylene glycol, alcohol, sorbic alcohol, boracic acid, triethanolamine, ethylenediamine tetraacetic acid and water as raw materials. In U.S. Pat. No. 2,690,426, a hydrophilic, water-dispersible oil phase system used in the textile industry and other industry fields is obtained by using a combination of a mineral oil and a polyoxyethylene sorbitan monostearic acid compound, with a further addition of polyoxyethylene stearyl alcohol, polyoxyethylene stearic acid or polyoxyethylene stearyl alcohol amine as a lubricating ingredient. These water-soluble lubricants used in the metal processing industry can not be used to treat medical apparatus due to degradation properties and/or component toxicity.

In the medical industry, aqueous lubricants are used for the surface lubrication of catheters, cannulas or puncture needles. For example, in U.S. Pat. No. 6,046,143, an aqueous lubricant used for the surface lubrication of catheters discloses modified silicone resin as a lubricating ingredient. Additionally, WO/1999/047187 and U.S. Pat. No. 5,688,747 also disclose water-based lubricating oils used for the surface treatment of catheters comprising silicone as a lubricating ingredient. However, silicone is used, which can be difficult to maintain as stable in an emulsion.

Therefore, a stable silica/silicone free aqueous lubricant used for the treatment of surgical medical apparatus after washing would be desirable.

SUMMARY OF THE INVENTION

One aspect of the invention is to provide a stable aqueous lubricant emulsion for medical apparatus is essentially free of silica and/or silicone and which can be kept stable for a long time (for example, with a shelf life of 2 years).

Another aspect of the invention is to provide a method for washing medical apparatus which can provides functions of anticorrosion and lubrication and is environmentally-friendly.

In one aspect, the invention provides an aqueous lubricant emulsion for a medical apparatus, in terms of the weight ratio based on the total weight of the emulsion, the emulsion comprising:

(a) 5 wt % to 30 wt % of a mineral oil;
(b) 5 wt % to 30 wt % of an emulsifier system consisting of two emulsifiers selected from the group consisting of sorbitan fatty acid ester, polyoxyethylene sorbitan fatty acid ester, oleyl alcohol ether, triethanolamine oleate, wherein the mass ratio of the two emulsifiers is in a range of 2:8 to 8:2;
(c) 0.5 wt % to 5 wt % of one or more coemulsifiers selected from the group consisting of fatty alcohols, long-chain fatty acids and diisooctyl succinate sulfonates; and
(d) water. The composition may also comprise other optional additives, such as a defoamer, antirust agent, or film formers. All weight ratios described herein are in terms of the weight ratio based on total weight of the composition unless specified otherwise.

In another aspect, the invention provides an aqueous lubricant emulsion for a medical apparatus, in terms of the weight ratio based on the total weight of the emulsion, the emulsion comprising:

(a) 5 wt % to 30 wt % of a mineral oil;
(b) 5 wt % to 30 wt % of an emulsifier system consisting of (i) a combination of sorbitan fatty acid ester and polyoxyethylene sorbitan fatty acid ester, or (ii) a combination of oleyl alcohol ether and polyoxyethylene sorbitan fatty acid ester, or (iii) a combination of sorbitan fatty acid ester and triethanolamine oleate, wherein the mass ratio of the any of the combinations is in a range of 2:8 to 8:2;
(c) 0.5 wt % to 5 wt % of one or more coemulsifiers selected from the group consisting of fatty alcohols, long-chain fatty acids and diisooctyl succinate sulfonates; and
(d) the balance of water. The composition may also comprise other optional additives, such as a defoamer, antirust agent, and film formers. All weight ratios are in terms of the weight ratio based on total weight of the composition unless specified otherwise.

The lubricant emulsion for medical apparatus described herein is an oil-in-water type emulsion which can be kept stable for a long time. In most embodiments, the emulsion is stable (e.g., a single phase emulsion) after storage for 3 months at a temperature of 0-5° C., or after storage for 3 months at a temperature of 37° C., or after storage for 2 months at a temperature of 54° C.

The lubricant emulsion can be used after the washing of surgical medical apparatus and before sterilization. This emulsion has the functions of anticorrosion and lubrication, and thus the application of derusters is reduced greatly or eliminated. Additionally, the emulsion is essentially free of silicone or paraffin waxes and the ingredients are environmentally-friendly, degrade easily and convenient to apply during use.

In another aspect, the invention provides a method for washing medical apparatus using the lubricant emulsions described herein to treat the medical apparatus after washing. The method of the invention can provide anticorrosion and lubrication and is environmentally-friendly, which reduces and/or eliminates the use of derusters significantly, and prolongs the service life of the medical apparatus.

DETAILED DESCRIPTION

The present invention relates to an aqueous lubricant for medical apparatus, and particularly, to a non-silica gel type aqueous lubricant emulsion for the treatment of medical apparatus after washing. The invention further relates to a method for washing medical apparatus.

In the invention, unless specified otherwise, the term "medical apparatus" also includes food processing machines and dishware or the like, such as those used in the food processing industry and food service industry. The invention is applicable in the medical apparatus and medical industry, and the description as provided herein applies as well to a food apparatus as used in the food processing industry and food service industry.

Unless specified otherwise, the term "sorbitan fatty acid ester" is a product obtained by mono-esterifying or tri-esterifying an anhydrosorbitol and a higher fatty acid, wherein the fatty acid is preferably a saturated or unsaturated fatty acid with 12-18 carbon atoms. The term "polyoxyethylene sorbitan fatty acid ester" means a product formed by polymerizing a sorbitan fatty acid ester and ethylene oxide, wherein the polyoxyethylene has a polymerization degree of 20, and the fatty acid is preferably a saturated or unsaturated fatty acid with 12-18 carbon atoms.

Unless specified otherwise, the term "light white mineral oil" means a mineral oil with relatively low density and viscosity which is formed by necessary rigorous dewaxing and removal of impurities from hydroprocessed base oil, e.g., a saturated hydrocarbon type mineral oil with a viscosity of 10 to 50 $mm^2/s$, and preferably 10 to 30 $mm^2/s$ at 40° C.; and a density of 0.82 to 0.86 $kg/m^3$, and more preferably 0.84 to 0.86 $kg/m^3$ at 20° C.

Unless specified otherwise, the term "long-chain fatty alcohols" means fatty alcohols with amphiphatic properties, wherein the fatty carbon chains thereof generally have 10 carbon atoms or more, and straight chains or branched chains with 10-30 carbon atoms are preferable.

Unless specified otherwise, all of the percentages, parts and proportions in the invention are in terms of weight.

In most embodiments, an aqueous lubricant emulsion is provided for medical apparatus, and in terms of the weight ratio based on the total weight of the emulsion, emulsion includes:

(a) 5 wt % to 30 wt % of a mineral oil, preferably a light white mineral oil, and more preferably, a light white mineral oil with a viscosity of 10 to 30 $mm^2/s$ at 40° C.;

(b) 5 wt % to 30 wt % of an emulsifier system consisting of two emulsifiers selected from the group consisting of sorbitan fatty acid ester, polyoxyethylene sorbitan fatty acid ester, oleyl alcohol ether, and triethanolamine oleate, wherein the mass ratio of the two emulsifiers is in a range of 2:8 to 8:2;

(c) 0.5 wt % to 5 wt % of a coemulsifier being one or more selected from the group consisting of fatty alcohols (preferably, long-chain fatty alcohols), long-chain fatty acids, and diisooctyl succinate sulfonates; and (d) water.

In preferred embodiments, the emulsifier system consists of (i) a combination of sorbitan fatty acid ester and polyoxyethylene sorbitan fatty acid ester, or (ii) a combination of oleyl alcohol ether and polyoxyethylene sorbitan fatty acid ester, or (iii) a combination of sorbitan fatty acid ester and triethanolamine oleate, wherein the mass ratio of the any of the combinations is in a range of 2:8 to 8:2. In preferred embodiments, the balance of the composition is water.

According to some preferable embodiments of the invention, the lubricant emulsion of the invention further contains an antirusting agent as one optional other additive and the content thereof in the emulsion of the invention is preferably 0.1 wt % to 3 wt %. According to some further preferable embodiments of the invention, the antirusting agent is selected from one or more of the group consisting of sulfonates, organic carboxylic acids and salts thereof, organic phosphates, esters, organic amines and heterocyclic compounds.

According to some preferable embodiments of the invention, the lubricant emulsion of the invention further contains an auxiliary agent as another optional other additive. Examples of the auxiliary agent include, but not limited to film-forming agents, preserving agents, pH regulators, and antifoaming agents.

The above film-forming agent mainly means water-soluble polymers, for example, one or more selected from the group consisting of polyvinyl alcohol (preferably with lower numbers of alcohol groups, and lower viscosity for the aqueous solution), water soluble celluloses and derivatives thereof, polyvinylpyrrolidone or the like. The content of the film-forming agent in the emulsion of the invention is preferably 0.01 wt % to 0.5 wt %.

The above preserving agent mainly means the preserving agents of one or more selected from the group consisting of alcohol or aldehyde type preserving agents, benzoic acid and derivatives thereof, thiazolidones/isothiazolidones, sorbic acid and salts thereof, hexamethylenamine, sodium hydroxymethyl glycinate, undecylenic acid and derivatives thereof or the like. The content of the preserving agent in the emulsion of the invention is preferably 0.5 wt % to 2.0 wt %.

The above antifoaming agent mainly means polyether type compounds. The content of the antifoaming agent in the emulsion of the invention is preferably 0.01 wt % to 1.0 wt %.

The pH regulator typically means an organic or inorganic alkali base. The content of the pH regulator in the emulsion of the invention is preferably 0.1 wt % to 1.0 wt %.

A milk white oil-in-water emulsion or water-in-oil emulsion can be obtained by subjecting the respective components in the invention to heating dissolution and to powerful homogenization processing. For example, the stable emulsions as described herein can be formed by the following process: heating an oil phase and a water phase to 75-90° C. under a condition of stirring, respectively; transferring the oil phase to the water phase slowly and stirring the obtained mixture continually at this temperature for 30 min; and homogenizing the mixture (e.g., at a speed of 2800 RPM for 120 minutes) and cooling it naturally to room temperature so as to obtain a product. In an alternate process, the stable emulsions described herein can be formed by the following process: heating an oil phase and a water phase to 50-75° C., and more preferably 55-60° C., under a condition of stirring, respectively; transferring the water phase to the oil phase slowly and stirring the obtained mixture continually at this temperature for 30 min; and homogenizing the mixture e.g., at a speed of 2800 RPM for 120 minutes), adjusting the pH of the mixture, and cooling it naturally to room temperature so as to obtain a product. In certain embodiments, the heating of the oil and water phase is conducted in a temperature range in which phase transfer of the emulsion occurs (i.e., from water-in-oil to oil-in-water)

The oil-in-water type emulsion of the invention can be diluted in high multiples and has excellent stability, which can provide all-around lubrication and antirusting protection for the medical apparatus. All of the ingredients thereof are environment-friendly, degradable easily and applicable conveniently. The stability of the emulsion can be kept for at least 2 years.

SPECIFIC EXAMPLES

In the invention, all of the contents percentages are in terms of weight.

| Raw material | Supplier |
|---|---|
| Light white mineral oil | Shanghai Xinkairun Lubricating Oil Technology Co., Ltd. |
| Benzotriazole | Nanjing Runyou Chemical Industry Co., Ltd |
| Tween/Span series | Guangzhou Runhua Food Additive Co., Ltd. |
| Antifoaming agent (Dow defax-123 or DF1760) | Dow Chemical (Shanghai) Co., Ltd. |
| Polyvinyl alcohol | Shanghai Anna Chemical Industry Co., Ltd |
| Methylparaben | Kunshan Huaxin Daily Chemicals Co., Ltd. |
| Propylparaben | Kunshan Huaxin Daily Chemicals Co., Ltd. |
| Triethanolamine | Shanghai Xiangshun Trading Co., Ltd. |
| Sodium diisooctyl succinate sulfonate | Qingte Chemical Co., Ltd. |
| Kathon CG | Shanghai Gaowei Chemical Co., Ltd. |
| rosin amine | Shanghai Saifu Chemical Development Co. Ltd. |
| Cetyl/Octadecyl alcohol Oleic acid hydroxy ethyl cellulose | Shanghai Lvlv Trading Co. Ltd. |

Example 1

| Light white mineral oil | Oil phase | 15% |
|---|---|---|
| Tween 60/Span 80 (5.5/4.5) | Emulsifier | 7.5% |
| Cetyl/Octadecyl alcohol | Coemulsifier | 0.5% |
| Sodium diisooctyl succinate sulfonate | Coemulsifier | 0.5% |
| Water | | To 100% |

Example 2

| Light white mineral oil | Oil phase | 20% |
|---|---|---|
| Tween 60/Span 80 (6.5/3.5) | Emulsifier | 10% |
| Cetyl/Octadecyl alcohol | Coemulsifier | 1% |
| Sodium diisooctyl succinate sulfonate | Coemulsifier | 2% |
| Benzotriazole | antirusting agent | 1% |
| Polyvinyl alcohol | film-forming agent | 1% |
| antifoaming agent | antifoaming agent | 0.5% |
| Methylparaben/Propylparaben | preserving agent | 1% |
| Water | | To 100% |

Example 3

| Light white mineral oil | Oil phase | 10% |
|---|---|---|
| Tween 80/Span 20 (2.5/7.5) | Emulsifier | 5% |
| Octadecyl alcohol | Coemulsifier | 2% |
| Sodium diisooctyl succinate sulfonate | Coemulsifier | 3% |
| Benzotriazole | antirusting agent | 2% |
| Polyvinyl alcohol | film-forming agent | 2% |
| antifoaming agent | antifoaming agent | 0.5% |
| Kathon CG | preserving agent | 0.2% |
| Water | | To 100% |

Example 4

| Light white mineral oil | Oil phase | 15% |
|---|---|---|
| Tween 80/Span 65 (6/4) | Emulsifier | 7.5% |
| Octadecyl alcohol | Coemulsifier | 1% |
| Sodium diisooctyl succinate sulfonate | Coemulsifier | 2% |
| rosin amine | antirusting agent | 0.5% |
| Polyvinyl alcohol | film-forming agent | 2% |
| antifoaming agent | antifoaming agent | 0.5% |
| Kathon CG | preserving agent | 0.2% |
| Water | | To 100% |

Example 5

| Light white mineral oil | Oil phase | 15% |
|---|---|---|
| Tween 60/Span 80 (6.5/3.5) | Emulsifier | 7.5% |
| Cetyl/Octadecyl alcohol | Coemulsifier | 1% |
| Sodium diisooctyl succinate sulfonate | Coemulsifier | 1% |
| Benzotriazole | antirusting agent | 1% |
| Polyvinyl alcohol | film-forming agent | 1% |
| antifoaming agent | antifoaming agent | 1% |
| Methylparaben/Propylparaben | preserving agent | 1% |
| Water | | To 100% |

Example 6

| Light white mineral oil | Oil phase | 15% |
|---|---|---|
| Tween 20/Span 80 (5/5) | Emulsifier | 7.5% |
| Cetyl/Octadecyl alcohol | Coemulsifier | 1% |
| Sodium diisooctyl succinate sulfonate | Coemulsifier | 1% |
| Benzotriazole | antirusting agent | 1% |
| Polyvinyl alcohol | film-forming agent | 1% |
| antifoaming agent | antifoaming agent | 1% |
| Methylparaben/Propylparaben | preserving agent | 1% |
| Water | | To 100% |

Example 7

| Light white mineral oil | Oil phase | 15% |
|---|---|---|
| Tween 40/Span 40 (4.5/5.5) | Emulsifier | 7.5% |
| Cetyl/Octadecyl alcohol | Coemulsifier | 1% |
| Sodium diisooctyl succinate sulfonate | Coemulsifier | 1% |
| Benzotriazole | antirusting agent | 1% |
| Polyvinyl alcohol | film-forming agent | 1% |
| antifoaming agent | antifoaming agent | 1% |
| Sodium sorbate | preserving agent | 1% |
| Water | | To 100% |

Example 8

| Mineral Oil | 15% |
|---|---|
| Span 80 | 2.7% |
| Tween 80 | 5.4% |
| Oleic acid | 0.9% |
| DF1760 | 0.75% |
| Benzotriazole | 0.8% |
| Methyl paraben | 0.3% |
| Propyl paraben | 0.2% |
| Hydroxy ethyl cellulose | 0.02% |
| NaHCO3 | 0.03% |
| Water | To 100 |

Example 9

| Mineral Oil (LIGHT) 7# | 20% |
|---|---|
| Span 80 | 4.5% |
| Oleyl alcohol ether with 5 EO | 5.5% |
| Oleic acid | 0.8% |
| DF1760 | 0.9% |
| Benzotriazole | 0.8% |
| Methyl paraben | 0.3% |
| Propyl paraben | 0.2% |
| Hydroxy ethyl cellulose | 0.02% |
| NaOH | 0.05% |
| Water | To 100 |

Example 10

| Mineral Oil (LIGHT) 15# | 10% |
|---|---|
| Span 80 | 2.25% |
| Tween 60 | 5.1% |
| Oleic acid | 0.85% |
| DF1760 | 0.75% |
| Benzotriazole | 0.8% |
| Methyl paraben | 0.3% |
| Propyl paraben | 0.2% |
| Hydroxy ethyl cellulose | 0.02% |
| Triethanolamine | 0.05% |
| Water | To 100 |

Example 11

| Mineral Oil (LIGHT) 15# | 5% |
|---|---|
| Triethanolamine oleate | 0.9% |
| Tween 60 | 3.6% |
| Oleic acid | 2.7% |
| DF1760 | 0.6% |
| Benzotriazole | 1.0% |
| Methyl paraben | 0.3% |
| Propyl paraben | 0.2% |
| Hydroxy ethyl cellulose | 0.02% |
| Water | To 100 |

Example 12

| Mineral Oil (LIGHT) 15# | 30% |
|---|---|
| Span 80 | 6% |
| Tween 60 | 12% |
| Oleic acid | 2% |
| DF1760 | 1.0% |
| Benzotriazole | 1.0% |
| Methyl paraben | 0.3% |
| Propyl paraben | 0.2% |
| Hydroxy ethyl cellulose | 0.02% |
| Triethanolamine | 0.1% |
| Water | To 100 |

Test of Emulsion Stability:

Comparative Example

According to the formulations of example 1 and example 13 in U.S. Pat. No. 2,690,426, a transparent oil solution was obtained by dissolving respectively and mixing uniformly under a condition of stirring at room temperature, wherein the transparent oil solution was a water-soluble lubricating oil and stable under room temperature. In a ratio of 1:10 and 1:200 respectively, the oil solution was further poured into water under a condition of strong stirring and then stirred for 20 min to formulate aqueous emulsions which were broken 4 days later.

The primary emulsion and the 1:10 and 1:200 diluted emulsions thereof of according to the compositions described herein (such as Examples 1-8) were subjected to the same test as the comparative experiments. The primary emulsion and diluted emulsions were still stable after 4 days.

The various tests on the property of the emulsions according to the present invention are described as follows.

1. Centrifugal and accelerative test: After having been centrifuged for 60 min under a condition of 3500 rpm/min, the emulsions remained stable without demixing or precipitation;

2. After having been stored for 3 months at a low temperature of 0-5° C., the emulsions remained stable without demixing After having been stored for 3 months at a high temperature of 37° C., the emulsions remained stable without demixing After having been stored for 2 months at a high temperature of 54° C., the emulsions remained stable without demixing 3. Freeze-thaw test: A cycle was repeated by keeping a sample at −20° C. for 12 hours, then thawing the sample at room temperature for 12 hours and then exposing the sample to −20° C. After ten Freeze-thaw cycles, the emulsions remained without demixing.

Toxicity validation: A toxicity test was carried out by Shanghai Municipal Center for Disease Prevention and Control. The test was carried out according to the corresponding sections in Chapters 2.3.1, 2.3.3, 2.3.8.4 in Disinfecting Technology Standard, 2002, Ministry of Health of China. The result indicated that this formulation was a non-toxic product without stimulation to skin or micronucleus inducing effect.

The invention claimed is:

1. An aqueous lubricant emulsion for medical or food apparatus, comprising:
    (a) 5 wt % to 30 wt % of a mineral oil;
    (b) 5 wt % to 30 wt % of an emulsifier system consisting of
        (i) a combination of sorbitan fatty acid ester and polyoxyethylene sorbitan fatty acid ester, or
        (ii) a combination of oleyl alcohol ether and polyoxyethylene sorbitan fatty acid ester, or
        (iii) a combination of sorbitan fatty acid ester and triethanolamine oleate, wherein the mass ratio of the any of the combinations is in a range of 2:8 to 8:2;
    (c) 0.5 wt % to 5 wt % of one or more coemulsifiers selected from the group consisting of fatty alcohols, long-chain fatty acids, and diisooctyl succinate sulfonates; and
    (d) the balance of water.

2. The aqueous lubricant emulsion for medical or food apparatus according to claim 1, further comprising 0.1 wt % to 2 wt % of an antirusting agent based on the total weight of the emulsion.

3. The aqueous lubricant emulsion for medical or food apparatus according to claim 2, wherein the antirusting agent is one or more selected from the group consisting of sulfonates, organic carboxylic acids and the salts thereof, organic phosphates, esters, organic amines and heterocyclic compounds.

4. The aqueous lubricant emulsion for medical or food apparatus according to claim 1, further comprising an auxiliary agent being one or more selected from the group consisting of film-forming agent, preserving agent and antifoaming agent.

5. The aqueous lubricant emulsion for medical or food apparatus according to claim 4, wherein the film-forming agent is one or more selected from the group of polyvinyl alcohol, water soluble celluloses and the derivatives thereof, and polyvinylpyrrolidone.

6. The aqueous lubricant emulsion for medical or food apparatus according to claim 4, wherein the preserving agent is one or more selected from the group consisting of alcohol or aldehyde type preserving agents, benzoic acid and the derivatives thereof, thiazolidones/isothiazolidones, sorbic acid and the salts thereof, hexamethylenamine, sodium hydroxy methyl glycinate, and undecylenic acid and the derivatives thereof.

7. The aqueous lubricant emulsion for medical or food apparatus according to claim 4, wherein the antifoaming agent is a polyether type compound.

8. The aqueous lubricant emulsion for medical or food apparatus according to claim 1, wherein the mineral oil is a saturated hydrocarbon type mineral oil with a viscosity of 10 to 50 $mm^2/s$ at 40° C. and a density of 0.82 to 0.86 $kg/m^3$ at 20° C.

9. The aqueous lubricant emulsion for medical or food apparatus according to claim 1, wherein the mineral oil is a saturated hydrocarbon type mineral oil with a viscosity of 10 to 30 $mm^2/s$ at 40° C. and a density of 0.84 to 0.86 $kg/m^3$ at 20° C.

10. The aqueous lubricant emulsion for medical or food apparatus according to claim 1, wherein the fatty alcohol is a linear or branched fatty alcohol with a fatty carbon chain containing 10-30 carbon atoms.

11. The aqueous lubricant emulsion for medical or food apparatus according to claim 1, wherein the long-chain fatty acid is a saturated or unsaturated linear fatty acid with a fatty carbon chain containing 10-30 carbon atoms.

12. An aqueous lubricant emulsion for medical or food apparatus, the emulsion comprising:
    (a) 5 wt % to 30 wt % of a mineral oil;
    (b) 5 wt % to 30 wt % of an emulsifier system consisting of two emulsifiers selected from the group consisting of sorbitan fatty acid ester, polyoxyethylene sorbitan fatty acid ester, oleyl alcohol ether, and triethanolamine oleate, wherein the mass ratio of the two emulsifiers is in a range of 2:8 to 8:2;
    (c) 0.5 wt % to 5 wt % of one or more coemulsifiers selected from the group consisting of fatty alcohols, long-chain fatty acids and diisooctyl succinate sulfonates; and
    (d) water.

13. A method of washing medical or food apparatus comprising washing the medical or food apparatus, and then treating the medical or food apparatus with the aqueous lubricant emulsion according to claim 1.

14. A method of washing medical or food apparatus comprising washing the medical or food apparatus, and then treating the medical or food apparatus with the aqueous lubricant emulsion according to claim 12.

\* \* \* \* \*